Sept. 5, 1944.   R. C. MOLLOY   2,357,680
SHOCK WAVE AIR BRAKE
Filed April 9, 1941   2 Sheets-Sheet 1

INVENTOR
Richard C. Molloy.
BY Harris G. Luther
ATTORNEY

Sept. 5, 1944.   R. C. MOLLOY   2,357,680
SHOCK WAVE AIR BRAKE
Filed April 9, 1941   2 Sheets-Sheet 2

INVENTOR
Richard C. Molloy.
BY Harris G. Luther
ATTORNEY

Patented Sept. 5, 1944

2,357,680

UNITED STATES PATENT OFFICE 2,357,680

SHOCK WAVE AIR BRAKE

Richard C. Molloy, Glastonbury, Conn., assignor to United Aircraft Corporation, East Hartford, Conn., a corporation of Delaware Application April 9, 1941, Serial No. 387,695

6 Claims. (Cl. 244—113)

This invention relates to improvements in airplanes and has particular reference to an improved air brake for controlling the speed of an airplane.

An object of the invention resides in the provision of an improved air brake for high-speed airplanes having the maximum braking effect for the weight and volume of the brake member.

Another object is to provide a structure which will increase drag by production of a compressibility burble at as slow an airplane speed as possible.

A further object resides in the provision of an improved air brake of the character indicated which does not change the shape or surface of the airplane when in its neutral or retracted position and which adds a minimum weight to the airplane in relation to the braking effect obtained.

Other objects and advantages will be more particularly pointed out hereinafter or will become apparent as the description proceeds.

In the accompanying drawings, in which like reference numerals are used to designate similar parts throughout, there is illustrated, in two slightly different forms, a suitable mechanical embodiment for the purpose of disclosing the invention. The drawings, however, are for the purpose of illustration only and are not to be taken as limiting or restricting the invention since it will be apparent to those skilled in the art that various changes in the illustrated embodiments may be resorted to without in any way exceeding the scope of the invention.

In the drawings, Fig. 1 is a plan view of a fragmentary portion of an airplane showing the application thereto of an air brake constructed according to the invention.

Figure 1:
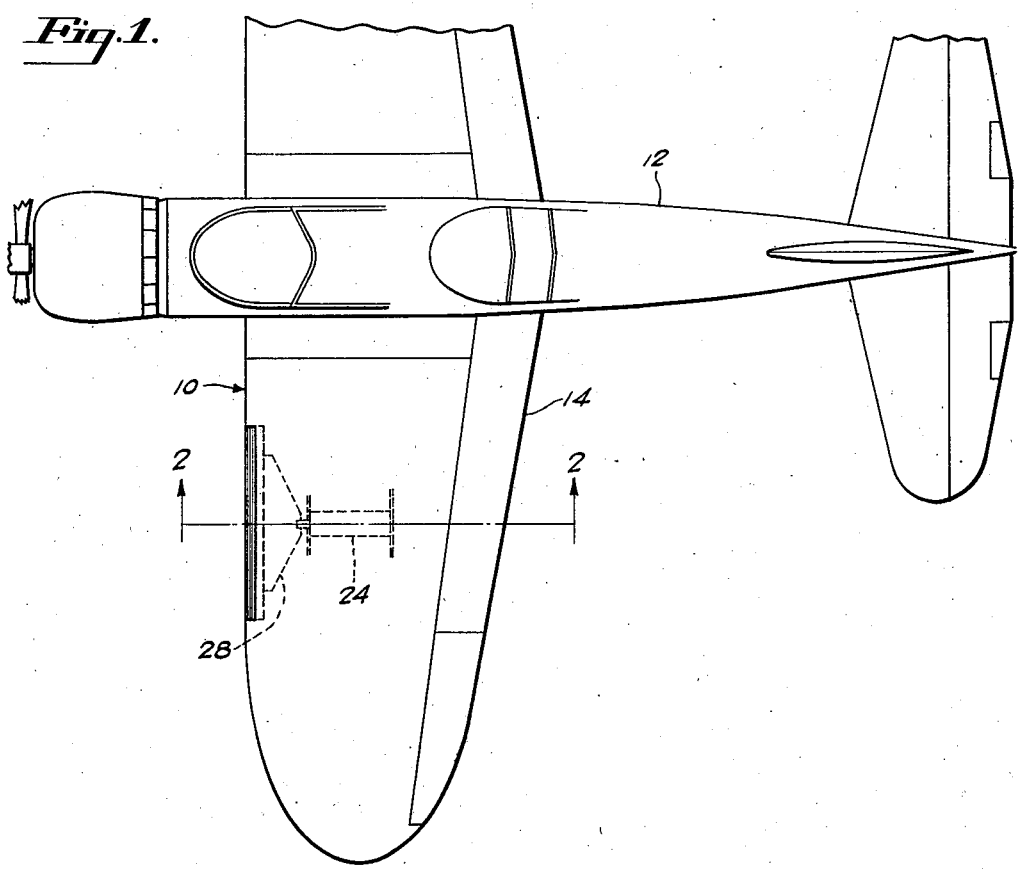
Figure 2:
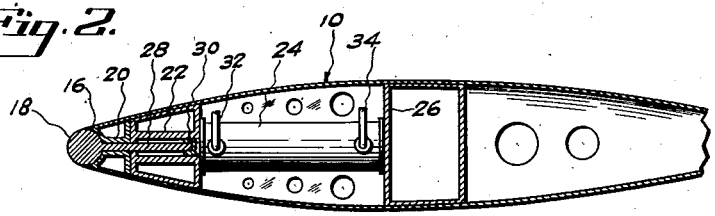
Fig. 2 is a transverse sectional view of an enlarged scale on the line 2—2 of Fig. 1.
Figure 3:
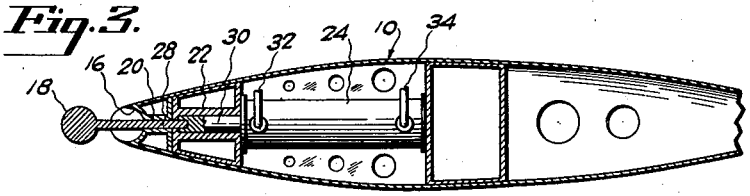
Fig. 3 is a view similar to Fig. 2 showing the air brake member in extended or operative position.

Referring to the drawings in detail and particularly to Figs. 1, 2 and 3, the numeral 10 generally indicates an airplane wing extending from a body or fuselage 12. The airplane illustrated is a type particularly designed for high speed operation which implies an extremely clean design having minimum aerodynamic drag. When an airplane of that type is placed in a dive position it is desirable that some means be provided to prevent the airplane from attaining too high a terminal velocity. Without a dive brake an airplane of this type can easily attain a terminal velocity over six hundred miles per hour. An air brake of the type proposed could be used to limit the terminal velocity to about three hundred miles per hour or less.

In the form of the invention illustrated in Figs. 1, 2 and 3 the leading edge of the wing is provided over an intermediate portion of its length with a partly cylindrical concavity 16 which receives the rearward portion of a cylindrical member 18. While the member 18 may be dimensioned and positioned relative to the wing as may be found desirable, in the example illustrated it is so located that its mid-length position is near the mid-length position of the wing and it has a length approximately one-half the length of the wing. In an actual installation it would be so positioned spanwise as to cause a minimum interference effect on the tail surfaces when in operation. In the chordwise direction it would be desirable to so locate it as to cause a minimum change in pitching effect when the device is operated. In the latter case the arrangement shown in Fig. 4 would undoubtedly be superior to that illustrated in Fig. 1.

A guide 20 extends rearwardly within the wing from the rear of the concavity 16 and a cross head 22 extends rearwardly from the guide 20 to the front end of a cylinder 24. The guide and cross head may be secured in the wing by suitable transverse partitions or diaphragms and the front end of the cylinder 24 may be supported on the cross head while its rearward end may be supported on a transverse partition 26 which may constitute a part of a spar or other structural element of the airplane wing. A web member 28 extends rearwardly from the cylindrical member 18 through the guide 20 and into the cross head 22 where it is connected to the projecting end of a piston rod 30 connected at its opposite end to a piston, not illustrated, reciprocable in the cylinder 24. Hydraulic fluid under pressure may be led to the opposite ends of the cylinder through suitable conduits 32 and 34 and the connection of these conduits with a source of fluid under pressure and with a drain or sump may be controlled by a suitable manually operable valve, not illustrated.

With this arrangement, admission of fluid under pressure to the rearward end of the cylinder 24 while connecting the forward end of the cylinder with drain, will force the cylindrical member 18 from its retracted position, illustrated in Fig. 2, to its extended position, illustrated in Fig. 3, in which it is disposed ahead of the leading edge of the wing and is moved through the air in advance of the wing.

It has been found in testing bodies of various cross-sectional shape that a body having a circular cross-sectional shape, that is, a cylindrical body, has the lowest critical speed. This means in effect, that the airflow around a cylindrical body subjected to a relative wind will set up supersonic compression or shock waves at a speed much lower than that of any other body. Since the drag coefficient of a body subjected to a relative wind increases rapidly when some portion of the airflow around such a body reaches sonic velocity with the consequent propagation of compression waves, it is conceived that a body of such circular cross-sectional shape projected into the air through which an aircraft is traveling will make the most effective air brake. For a further discussion of the relative ratios of critical speeds to sonic speeds of bodies of various cross-sectional shape reference may be had to Fig. 22 on page 23 of National Advisory Committee for Aeronautics Report No. 646, "Effect of Compressibility on Pressures and Forces Acting on an Airfoil," by Stack, Lindsey, and Littell, and page 217 of the Journal of the Royal Aeronautical Society for March, 1938, in the article, "Problems of High Speed Flight as Affected by Compressibility," by Relf.

In the form of the invention illustrated in Figs. 1, 2 and 3, the brake member 18, when rendered operative, is projected a sufficient distance ahead of the wing 10 so that the wing does not tend to materially streamline the rearward portion of the member and the action of the air in flowing about the brake member is substantially the same as that of the air flowing about a free cylindrical body and produces the high drag effect mentioned above. The brake member 18 may be retracted into its inoperative or neutral position, as illustrated in Fig. 2, in which it constitutes a portion of the airfoil contour of the leading edge of the wing, by operating the manually actuatable valve to connect the conduit 32 with the source of fluid under pressure and the conduit 34 with the sump or drain.

Figure 4:
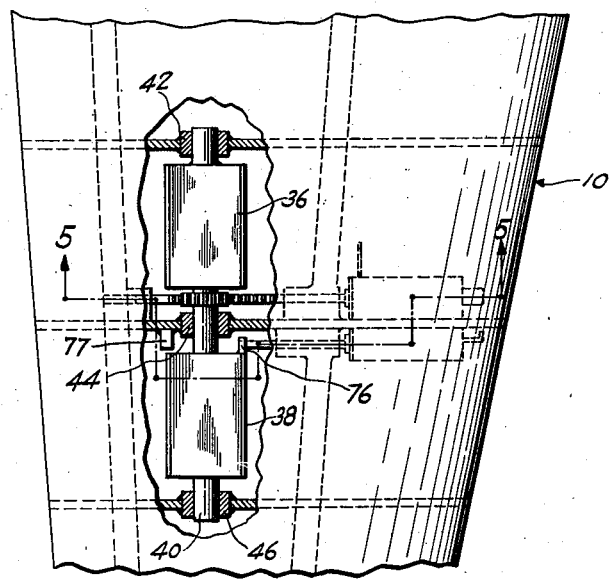
Fig. 4 is a top plan view of a fragmentary portion of an airplane wing showing the application thereto of a somewhat modified form of air brake constructed according to the invention.
Figure 5:
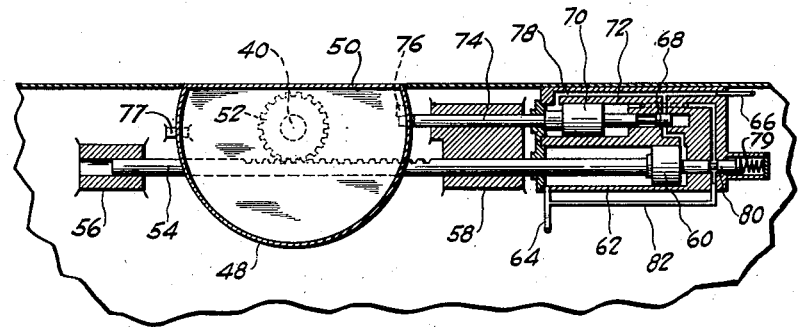
Fig. 5 is a transverse sectional view on an enlarged scale on the line 5—5 of Fig. 4.
Figure 6:
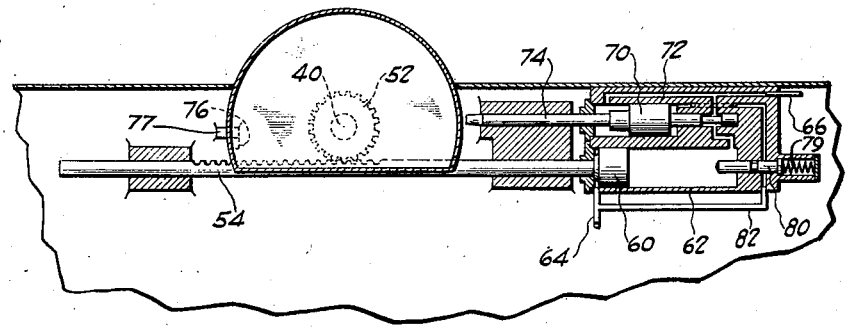
Fig. 6 is a transverse sectional view similar to Fig. 5 showing the modified form of air brake in its extended or operative position.

In the form of the invention shown in Figs. 4, 5 and 6 one or more partly cylindrical hollow members, as indicated at 36 and 38, are mounted on an axle 40 which is disposed spanwise of the wing 10 and rotatably mounted in suitable bearings, as indicated at 42, 44 and 46, carried by respective transverse structural members within the wing. Each of the members 36 and 38 includes one portion 48 formed as a part of a cylinder of circular cross-section and a part 50 formed as a relatively flat member joining the edges of the partly cylindrical portion. The members are so dimensioned and the axle 40 is so disposed in the wing that when the members are in their inoperative or retracted positions, as illustrated in Fig. 5, the relatively flat surface portion of each member lies between opposite edges of the wing covering disposed at opposite sides of the space occupied by the brake members and constitute a smooth continuation of the upper surface of the wing over the space so occupied by the brake members so that the brake members have no effect on the wing surface or contour when in their retracted position. The brake members may be rotated to bring their cylindrical portions above the wing to the operative or extended position shown in Fig. 6, by suitable means one example of which is illustrated in the accompanying drawings. In the arrangement illustrated, the axle 40 has a gear 52 fixed thereon the teeth of which mesh with teeth provided on a rack bar 54 slidably mounted in bearings 56 and 58 carried by the wing structure. One end of the rack bar 54 is connected to a piston 60 reciprocable in a cylinder 62 secured to the structure of the wing. Fluid lines 64 and 66 lead to the opposite ends of this cylinder 62 from a manually operable control valve, not illustrated, so that fluid under pressure may be applied to either end of the cylinder and the opposite ends connected with drain to move the piston 60 and rack bar 54. The tube 66 leads to the rearward end of the cylinder 62 through a valve 68 operated by the piston 70 of a locking device which includes, in addition to the piston 70, a cylinder 72 and a piston rod 74 or lock bar projecting from the cylinder and through the bearing block 58 and adapted to engage at its outer end a stop 76 on one of the brake members 36 or 38 which with the action of spring 79 acts to retain the member in the retracted position illustrated in Fig. 5. The line 66 has a branch 78 leading to the forward end of the cylinder 72. The line 64 leads to the forward end of the cylinder 62 and has a branch leading through a valve 80 operated by the piston 60 to the rearward end of the cylinder 72.

The operation of this device is substantially as follows:

Assuming that the device is in the inoperative position illustrated in Fig. 5 and it is desired to bring it to the extended or operative position shown in Fig. 6, the manually actuated valve would be operated to connect the line 66 with the source of fluid under pressure and the line 64 with drain. Fluid would then flow into the forward end of the cylinder 72 and move the piston 70 rearwardly to release the brake members from the lock bar 74 at the same time moving valve 68 to open position. When the valve 68 is open fluid will then flow to the rearward end of the cylinder 62 moving the piston 60 forwardly and rotating the brake members from the position shown in Fig. 5 to that shown in Fig. 6 in which the brake member is positioned by the stop 76 contacting the block 77 and permitting the spring 79 to close valve 80. When it is desired to retract the brake members, the line 64 would be connected with the source of fluid under pressure and the line 66 connected with drain. The fluid would then flow to the forward end of the cylinder 62 moving the piston 60 rearwardly and rotating the brake members towards their retracted position. As the piston 60 approaches the end of its stroke it contacts the plunger of the valve 80, compresses spring 79 and opens this valve permitting fluid to flow through the branch channel 82 and valve 80 to the rearward end of the cylinder 72 to move the piston 70 forwardly to lock the brake members by inserting the end of the piston rod 74 back of the stop 76.

The cylindrical portion of the brake members 36 and 38 when extended above the wing surface, cause an abrupt change in the direction of airflow over the upper surface of the wing and due to their cylindrical shape create a localized area of extremely high velocity airflow which reaches sonic speed at a relatively low speed of the airplane and causes compression or shock waves to be set up about the brake members thereby greatly increasing the drag of the airplane and reducing its speed.

While two slightly different structural embodiments have been hereinabove described and illustrated in the accompanying drawings for the purpose of disclosing the invention, it is to be understood that the invention is not limited to the particular embodiments so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. An air brake for an airplane having a wing provided with a spanwise concavity in a portion of the leading edge thereof comprising, an elongated body of generally circular cross-sectional shape partly receivable in said concavity to fill said concavity and constitute a portion of the airfoil contour of said wing and means secured to the wing and to the elongated body whereby the body is movable to a position in which it is spaced forwardly of the leading edge of said wing.

2. In combination with an airplane wing, an air brake mechanism including an elongated member of substantially circular cross section shape carried by said wing in a spanwise position, and means for moving said member between an inoperative location within the airfoil contour of said wing and a braking location in which said member is spaced ahead of said wing and completely outside of said airfoil contour whereby airflow around said member may attain local velocities as high as the velocity of sound and produce characteristic supersonic shock waves extending from said body without the forward speed of said wing exceeding a value materially in excess of one-half the speed of sound.

3. An air brake for an airplane wing comprising, a spanwise extending wing-carried body having a substantially continuous curved surface projectable from a non-braking position inside the airfoil contour of said wing to a braking position outside of the airfoil contour of said wing in which the axis of said surface is substantially perpendicular to the direction of airflow over said wing, said surface having a curvature effective to produce local supersonic velocities and compression shock waves in the airstream flowing thereover at a general airflow velocity as low as three hundred and fifty miles per hour, and means for translating said body between said non-braking and braking positions.

4. In combination with an aircraft structure having a streamlined contour, an aerodynamic shock wave brake comprising, a member carried by said structure and mounted for movement relative thereto, said member having a curved surface effective to produce local supersonic air velocities thereover when positioned in an airstream having a velocity relative to said member of a value as low as approximately one-half the speed of sound, means for positioning said curved surface of said member within the contour of said aircraft structure for non-braked flight, and means for bodily projecting said member wholly outside of said contour for materially increasing the drag of said aircraft by producing a compression shock wave in the airstream passing over said member.

5. In combination with an aircraft structure having a streamlined contour, an air brake device including an elongated substantially cylindrical member carried by said aircraft structure in a non-braking position within said streamlined contour, and means for moving said member forwardly relative to said structure to a braking location in which said member is positioned with its longitudinal axis generally normal to the direction of the airstream relative thereto and is effective to produce local supersonic velocities and accompanying compression shock waves in said airstream, and thereby increase the drag of the aircraft, when the velocity of said member relative to said airstream is substantially less than the speed of sound.

6. An air brake for an airplane wing comprising, a spanwise extending wing-carried body having a substantially continuous curved surface of cylindrical shape projectable from a non-braking position inside the airfoil contour of said wing to a braking position in which said body is disposed wholly outside of the airfoil contour of said wing and in which the axis of said surface is substantially perpendicular to the direction of airflow over said wing, said surface having a curvature effective to produce local supersonic velocities and compression shock waves in the airstream flowing thereover at a general airflow velocity as low as three hundred and fifty miles per hour.

RICHARD C. MOLLOY.